US011961970B2

(12) United States Patent
Vestergaard Frandsen et al.

(10) Patent No.: US 11,961,970 B2
(45) Date of Patent: Apr. 16, 2024

(54) LiS BATTERY WITH LOW SOLVATING ELECTROLYTE

(71) Applicant: SCEYE SA, Zug (CH)

(72) Inventors: Mikkel Vestergaard Frandsen, Tuboron, CA (US); David Kim, Santa Fe, NM (US); Holger Althues, Dresden (DE); Paul Hartel, Dresden (DE); Thomas Abendroth, Dresden (DE); Susanne Dörfler, Dresden (DE); Benjamin Schumm, Dresden (DE); Stefan Kaskel, Dresden (DE); Christine Weller, Dresden (DE)

(73) Assignee: SCEYE SA, Zug (CH)

( * ) Notice: Subject to any disclaimer, the term of this patent is extended or adjusted under 35 U.S.C. 154(b) by 491 days.

(21) Appl. No.: 17/422,232

(22) PCT Filed: Jan. 14, 2020

(86) PCT No.: PCT/EP2020/050821
§ 371 (c)(1),
(2) Date: Jul. 12, 2021

(87) PCT Pub. No.: WO2020/148258
PCT Pub. Date: Jul. 23, 2020

(65) Prior Publication Data
US 2022/0085416 A1    Mar. 17, 2022

Related U.S. Application Data

(60) Provisional application No. 62/793,474, filed on Jan. 17, 2019.

(51) Int. Cl.
*H01M 10/0569* (2010.01)
*H01M 10/0525* (2010.01)
(Continued)

(52) U.S. Cl.
CPC ... *H01M 10/0569* (2013.01); *H01M 10/0525* (2013.01); *H01M 10/0568* (2013.01);
(Continued)

(58) Field of Classification Search
CPC . Y02E 60/10; H01M 10/052; H01M 10/0525; H01M 10/0568; H01M 10/0569;
(Continued)

(56) References Cited

U.S. PATENT DOCUMENTS 6,218,054 B1   4/2001   Webber
6,225,002 B1   5/2001   Nimon
(Continued)

FOREIGN PATENT DOCUMENTS

CN   107681197 A   2/2018
CN   108054350 A   5/2018
(Continued)

OTHER PUBLICATIONS

Cheng et al., "Sparingly Solvating Electrolytes for High Energy Density Lithium-Sulfur Batteries", ACS Energy Letters, 2016.
(Continued)

*Primary Examiner* — Victoria H Lynch
(74) *Attorney, Agent, or Firm* — Cermak Nakajima & McGowan LLP; James Creighton Wray

(57) ABSTRACT

A lithium sulfur battery with a low solvating electrolyte at an amount of less than 2 µl per mg sulfur. The electrolyte comprises dioxolane and hexylmethylether, as well as a Li salt, for example LiTSFi. The electrolyte is free from lithium nitrate, $LiNO_3$.

14 Claims, 3 Drawing Sheets

(51) Int. Cl.
*H01M 10/0568* (2010.01)
*H01M 4/02* (2006.01)
*H01M 4/38* (2006.01)

(52) U.S. Cl.
CPC .................. *H01M 2004/027* (2013.01); *H01M 2004/028* (2013.01); *H01M 4/38* (2013.01); *H01M 2300/0037* (2013.01)

(58) Field of Classification Search
CPC ..... H01M 2004/027; H01M 2004/028; H01M 2300/0037; H01M 4/38
See application file for complete search history.

(56) References Cited

U.S. PATENT DOCUMENTS

| | | |
|---|---|---|
| 6,245,465 B1 | 6/2001 | Angell |
| 6,358,643 B1 | 3/2002 | Katz |
| 7,354,680 B2 | 4/2008 | Mikhaylik |
| 2004/0202936 A1 | 10/2004 | Mikhaylik |
| 2013/0202961 A1 | 8/2013 | Hagen |
| 2014/0234723 A1 | 8/2014 | Hagen |
| 2015/0061176 A1 | 3/2015 | Bruckner |
| 2015/0249244 A1 | 9/2015 | Thieme |
| 2015/0249260 A1 | 9/2015 | Bruckner |
| 2019/0051940 A1 | 2/2019 | Park et al. |
| 2021/0151801 A1* | 5/2021 | Weller ................ H01M 10/052 |

FOREIGN PATENT DOCUMENTS

| | | |
|---|---|---|
| CN | 108091835 A | 5/2018 |
| CN | 108281633 A | 7/2018 |
| DE | 102017209790 A1 | 12/2018 |
| EP | 0829911 A2 | 3/1998 |
| EP | 0845828 A1 | 6/1998 |
| JP | 2005-235589 A | 9/2005 |
| JP | 2012-109223 A | 6/2012 |
| JP | 2018-519620 A | 7/2018 |
| WO | 0036683 A2 | 6/2000 |
| WO | 2014191420 A1 | 12/2014 |
| WO | 2016177614 A1 | 11/2016 |
| WO | 2017183810 A1 | 10/2017 |
| WO | 2018004110 A1 | 1/2018 |
| WO | 2018224374 A1 | 12/2018 |
| WO | WO2018/224374 A1 | 12/2018 |

OTHER PUBLICATIONS

Kim et al., "The cycling performances of lithium-sulfur batteries 'in TEGDME/D0L containing LiN03 additive", IONICS, vol. 19, No. 12, Dec. 30, 2013.

Lee et al., "Directing the Lithium-Sulfur Reaction Pathway via Sparingly Solvating Electrolytes for High Energy Density Batteries", ACS Central Science, published by Lee, Pang, Ha, Cheng, Sang-Don Han, Zavadil, Gallagher, Nazar, and Balasubramanian, 2017.

Wang et al., "The electrochemical performance of lithium-sulfur batteries with LiClO4 DOL/DME electrolyte", Journal of Applied Electrochemistry, Kluwer Academic Publishers, Do, vol. 40, No. 2, Sep. 1, 2009.

Kim, H.S. et al., "The cycling performances of lithium-sulfur batteries in TEGDME/DOL containing LiNo3 additive," Ionics, vol. 19, No. 12, (Dec. 30, 2013); pp. 1795-1802.

Cheng, L. et al., "Sparingly Solvating Electrolytes for High Energy Density Lithium-Sulfur Batteries," ACS Energy Lett., 2016, vol. 1; pp. 503-509.

Wang, W. et al., "The electrochemical performance of lithium-sulfur batteries with LiClO4 DOL/DME electrolyte," Journal of Applied Electrochemistry, vol. 40, (Sep. 1, 2009); pp. 321-325.

* cited by examiner

LiS BATTERY WITH LOW SOLVATING ELECTROLYTE

This application claims the benefit of U.S. Provisional Application No. 62/793,474 filed Jan. 17, 2019 and PCT/EP2020; 050821 filed Jan. 14, 2020, International Publication No. WO 2020/148285 A1, which are hereby incorporated by reference in their entirety as if fully set forth herein.

FIELD OF THE INVENTION

The present invention relates to a lithium sulfur (LiS) battery with a sparingly solvating electrolyte.

BACKGROUND OF THE INVENTION

For lithium sulfur (LiS) battery cells with liquid, it is a common approach to use electrolytes in which a large fraction of the electrochemically active sulfur, especially polysulfides, is dissolved in the electrolyte.

Examples are disclosed in U.S. Pat. No. 7,354,680 assigned to Sion Power, in particular disclosing electrolytes comprising an acyclic ether, for example 1,3-dioxolane (DOL, $C_3H_6O_2$), and a cyclic ether, for example dimethoxyethane (DME), as well as lithium salts, for example LiN$(CF_3SO_2)_2$ (Bis(trifluoromethane)sulfonimide lithium salt) which is also called LiTFSI. In addition, the electrolyte contains lithium nitrate $LiNO_3$ as an additive. The latter additive is generally regarded as preventing quick reduced performance of the battery by migration of polysulfides. However, creation of gases is one of the problems of this technology.

Alternative approaches include low-solvating electrolytes, in which the electrochemically active sulfur is only sparingly dissolved. In the general art of electrolytes for batteries, the term "low solvating" is used alongside the term "sparingly solvating" for those electrolytes that do only dissolved a low amount of the available polysulfides.

As there is no need for a high volume to dissolve the polysulfides, lower amounts of electrolyte can be used, which in turn reduces the overall weight of the cell and has therefore potential for increasing the energy density correspondingly.

This subject is discussed in the article "Sparingly Solvating Electrolytes for High Energy Density Lithium-Sulfur Batteries", which is published by Cheng, Curtiss, Zavadil, Gewirth, Shao, and Gallagher in 2016 in ACS Energy Letters and available on the Internet http://pubs.acs.org/journal/aelccp. It is explained in this article that values near 1 ml electrolyte per gram of sulfur is necessary to compete with lithiumion technology on an energy density basis, but this low amount is regarded as challenging.

A further discussion is found in the article "Directing the Lithium-Sulfur Reaction Pathway via Sparingly Solvating Electrolytes for High Energy Density Batteries" published by Lee, Pang, Ha, Cheng, Sang-Don Han, Zavadil, Gallagher, Nazar, and Balasubramanian in 2017 in ACS Central Science and available on the Internet http://pubs.acs.org/journal/acscii.

Examples of sparingly solvating electrolytes are disclosed in Chinese patent applications CN107681197A, CN108054350A, CN108281633A, and CN108091835A. Further examples are disclosed in WO2018/004110 in Korean language, especially the mix of a cyclic ether, for example DOL, and a glycol ether for the electrolyte, which also contains a lithium salt.

Other examples of sparingly solvating electrolytes are disclosed in German patent application DE102017209790.6 assigned to Fraunhofer as well as in the corresponding International patent application WO2018/224374. In these publications, the preferred electrolyte contains Hexylmethylether (HME) and 1,2-Dimethoxyethane in a volume ratio of 80:20. Other examples of electrolytes with HME and a further ether are not specifically disclosed in WO2018/224374.

As it appears from the above, sparingly solvating electrolytes have been proposed in general, and it has been recognized that low amounts thereof is an advantage. However, no practical technical solution has yet been proposed. In particular, no satisfying technical solution has yet been found for electrochemical cells with electrolyte amounts as low as 2 ml/g electrolyte, or even less.

DESCRIPTION/SUMMARY OF THE INVENTION

It is therefore the object of the invention to provide an improvement in the art. In particular, it is an objective to provide a LiS battery with a high energy density. A further objective is to provide an electrochemical cell with a low amount of a sparingly solvating electrolyte, in particular with electrolyte amounts less than 2 ml/g electrolyte.

These objectives are achieved with a LiS battery cell as explained in more detail in the following. In particular, it has been demonstrated that a LiS battery construction is possible with electrolyte volumes of less than 2 ml/g sulfur. Experimentally, electrochemical cells with high energy density of more than 400 Wh/kg were obtained with volumes of electrolytes as low as 1.6 ml/g. Herein, the relative volumes of electrolyte are given in ml electrolyte per gram of sulfur (ml/g), which is equal to the unit μl/mg.

The term sparingly solvating is used for electrolytes configured for dissolving only a small fraction of available polysulfides during charge and discharge of the battery. For example, the fraction is less than 5%, optionally less than 2%.

The electrochemical cell comprises the following:
a negative lithium electrode;
a positive sulfur electrode, the sulfur electrode comprising an electrically conductive porous carbon matrix having pores containing sulfur;
a current collector abutting the sulfur electrode;
a separator arranged between the lithium electrode and the sulfur electrode;
an electrolyte arranged between the electrodes for transport of Li ions between the electrodes.

Good results were obtained with an electrolyte that comprises a non-polar, acyclic non-fluorinated ether, in particular Hexylmethylether, $C_7H_{16}O$ (HME), and a polar ether, in particular 1.3 dioxolane $C_3H_6O_2$ (DOL).

Optionally, this mix is provided at a volume ratio between HME:DOL in the range of 2:1 to 1:2 optionally the range is an open range such that end points are not included in the range. For example, the range is 1.5:1 to 1:1.5, optionally around 1:1, such as 1:1.2 to 1.2:1.

It is noticed that such amount of HME relatively to DOL is far from the range of 80:20 between HME and 1,2-Dimethoxyethan as disclosed in the above-mentioned WO2018/224374. It is also pointed out that the preferred concentration ratio for the non-polar ether relatively to the polar apriotic organic solvents in WO2018/224374 is above 2:1, even more preferred above 3:1, in particular in the range 3:1 to 9:1. It appears from WO2018/224374 that the amount of HME should be substantially higher, rather multiple times more, than the volume of the polar apriotic organic solvents. In contrast thereto, this is not necessary in the present invention where equal amounts have been used in experiments and where less HME than DOL is also possible.

Advantageously, a lithium salt is contained as well, for example $LiN(CF_3SO_2)_2$ (Bis(trifluoromethane)sulfonimide lithium salt) which is also called LiTFSI, advantageously at a molar concentration in the range of 1M to 4M. In experiments, 1.5M concentrations have been used.

Such electrolyte is low solvating. For example, the electrolyte is configured for dissolving only a fraction of available polysulfides during charge and discharge of the battery, the fraction being less than 5% or even less than 2%.

With such electrolyte, it has been experimentally verified that the electrochemical cell needs less than 2 ml electrolyte per g sulfur for achieving a high energy density in terms of Wh/kg.

In particular, it has been experimentally verified that the energy density of the electrochemical cell is higher than 400 Wh/kg for at least 5 cycles and higher than 350 Wh/kg for at least 20 cycles, when charged and discharged at a charging rate of 0.1 C.

Advantageously, the mass density of the positive sulfur electrode is higher than 0.55 $g/cm^3$, for example higher than 0.6 $g/cm^3$. A high mass density implies that the pores are relatively small. In some embodiments, the porous carbon matrix comprises pores with a pore volume, wherein at least 50% of the pore volume is defined by pores having an average pore diameter of less than 0.1 micron. Small pores are advantageous, as the volume for the electrolyte inside the cathode is minimized. Also, the stability of the cathode material against collapse under pressure is minimized. The latter is an important aspect if pressure is exerted on the electrochemical cell, for example as part of a stack of cells.

With small pore volumes, a high weight density of the cathode is possible. In experiments, a cathode mass density of higher than 0.6 $g/cm^3$ was achieved.

Advantageously, the pore volume of the cathode is in the range of 0.25 ml/g to 0.45 ml/g, for example in the range of 0.3 to 0.4 ml/g. In some embodiments, the pore volume of the cathode was 0.35 ml/g.

Optionally, the battery is constructed and arranged to apply a force onto the electrochemical cell, optionally in a cell stack, in a direction normal to the active surfaces of the electrodes during charging of the battery, the force being in the range of 10 to 50 $N/cm^2$. In experiments, a force of 37 $N/cm^2$ was successfully applied.

In some embodiments, the current collector is a perforated metal sheet with perforations, the perforations in total having an area of more than 50%, rather more than 70% or even more than 80%, of the area of one side of the metal sheet. In experiments, current collectors were used with perforations having an area around 80% of the sheet.

Optionally, the positive electrode is solidly bonded to the collector, forming an electrode/collector sheet unit.

Optionally, from the electrochemical cells, a battery is constructed comprising a plurality of these electrochemical cells arranged as a stack with two neighboring cells sharing the current collector, such that the current collector is sandwiched between the said sulfur electrode and a further identical sulfur electrode of a neighboring cell.

For an efficient secondary battery, multiple of the above electrochemical cells are stacked, for example 10, 20, 30 or 40 layers of the above type sandwich-combinations of anode, separator, current collector, and cathode.

It has been found advantageous experimentally to provide pressure onto the stack normal to the stack, for example in the range of 10 to 50 $N/cm^2$, optionally in the range 20 to 50 $N/cm^2$. In experiments, a force of 37 $N/cm^2$ was successfully applied.

Typically, the stacks are provided in pouch cells.

A useful separator material is a polyethylene (PE) or polypropylene (PP) film that has perforations across the film for flow of electrolyte through the perforations. Such films are available from the company Celgard®, see www.Celgard.com.

In some practical embodiments of stacks, the separator comprises a coating of the porous sulfur-containing porous carbon matrix for providing a combination of cathode and separator, wherein each two of such combinations are sandwiching one current collector with the cathode sides of the two combinations facing the current collector and being fastened to the current collector. Optionally, the combinations are also fastened to each other by extending through the perforations of the current collector.

In alternative embodiments, the cathode carbon and sulfur material is electrically conducting, for example by having integrated electrically conducting nanoparticles in the cathode material. One possibility is a cathode provided by hot-pressing carbon nanotubes (CNT) and sulfur particles into a composite, optionally also containing carbon black. In this case, the cathode conducts the current to the electrical connector at the edge of the sulfur cathode, and a metallic current collector can be avoided. For example, the mean diameter of the CNT is in the range of 5 to 10 nm.

In particular, it is recognized that there is no requirements for using lithium nitrate, LiNO3, as additive for the electrochemical cell despite its high performance.

The electrolyte is typically fluidic. Alternatively, it is provided as gel or solid.

Aspects

In the following, some aspects of the invention are explained in interrelation:

Aspect 1. A battery containing an electrochemical cell comprising
   a negative lithium electrode;
   a positive sulfur electrode, the sulfur electrode comprising
      an electrically conductive porous carbon matrix having pores containing sulfur;
   a current collector abutting the sulfur electrode;
   a separator arranged between the lithium electrode and the sulfur electrode;
   an electrolyte arranged between the electrodes for transport of Li ions between the electrodes. For example the electrolyte is low solvating. Optionally it is configured for dissolving only a fraction of available polysulfides during charge and discharge of the battery, the fraction being less than 5%.

Aspect 2: The battery according to Aspect 1, wherein the electrolyte between the electrodes is provided at an amount of less than 2 µl per mg sulfur Aspect 3: The battery according to any one of the preceding Aspect, wherein the electrolyte comprises a nonpolar, acyclic, non-fluorinated ether and a polar ether as well as a Li salt.

Aspect 4. The battery according to Aspect 3, wherein the electrolyte comprises a nonpolar, acyclic, non-fluorinated ether and a polar ether at a ratio in the range of 2:1 to 1:2, as well as a Li salt at a molar concentration in the range of 1M to 4M.

Aspect 5. The battery according to Aspect 3 or 4, wherein the polar ether is 1,3 dioxolane, DOL, and the non-polar ether is Hexylmethylether, HME.

Aspect 6. The battery according to any preceding Aspect 5, wherein the Li salt is Bis(trifluoromethane)sulfonimide lithium salt, LiTFSI.

Aspect 7. The battery according to any one of the preceding Aspects, wherein the energy density of the electrochemical cell is higher than 400 Wh/kg for at least 5 cycles and higher than 350 Wh/kg for at least 20 cycles, when charged and discharged at a charging rate of 0.1 C.

Aspect 8. The battery according to any one of the preceding Aspects, wherein the mass density of the positive electrode is higher than 0.5 g/cm$^3$.

Aspect 9. The battery according to any one of the preceding Aspects, wherein pores in the porous carbon matrix comprises pores with a pore volume, wherein at least 50% of the pore volume is defined by pores having an average pore diameter of less than 0.1 micron.

Aspect 10. The battery according to any one of the preceding Aspects, wherein the battery is constructed and arranged to apply a force onto the electrochemical cell in a direction normal to the active surfaces of the electrodes during charging of the battery, the force being in the range of 10 to 50 N/cm$^2$.

Aspect 11. The battery according to any one of the preceding Aspects, wherein the current collector is a perforated metal sheet with perforations, the perforations in total having an area of more than 50% of the area of one side of the metal sheet; wherein the positive electrode is solidly bonded to the collector, forming an electrode/collector sheet unit.

Aspect 12. The battery according to any one of the preceding Aspects, wherein the battery comprises a plurality of electrochemical cells arranged as a stack with two neighboring cells sharing the said current collector, wherein the said current collector is sandwiched between the said sulfur electrode and a further identical sulfur electrode of a neighboring cell.

Aspect 13. The battery according to Aspect 12, wherein the separator comprises a coating of the porous sulfur-containing porous carbon matrix for providing a combination of cathode and separator, wherein each two of such combinations are sandwiching one current collector with the cathode side facing the current collector and being fastened to the current collector, and wherein the combinations are fastened to each other by extending through the perforations of the current collector.

Aspect 14. The battery according to any one of the preceding aspects, wherein the stack is under pressure by a force in the range of 20 to 50 N/cm$^2$.

SHORT DESCRIPTION OF THE DRAWINGS

The invention will be explained in more detail with reference to the drawing, where FIG. 1 is a principle sketch of the electrochemical cell;

DETAILED DESCRIPTION/PREFERRED EMBODIMENT

The electrochemical cell comprises the following:
a negative lithium electrode;
a positive sulfur electrode, the sulfur electrode comprising an electrically conductive porous carbon matrix having pores containing sulfur;
a current collector abutting the sulfur electrode;
a separator arranged between the lithium electrode and the sulfur electrode;
an electrolyte arranged between the separator and each of the electrodes for transport of Li ions between the electrodes.

The components that were used in experiments are discussed in greater detail below wherein the electrolyte between the electrodes is provided at an amount of less than 2 μl per mg sulfur.

The electrochemical cell for the battery is free of lithium nitrate, $LiNO_3$.

In the experiments, an anode was used that was made of lithium (Li) metal foil with a thickness of 50 micrometer. In the particular cell, the size was 71 mm×46 mm.

A copper foil with a thickness of 10 micrometer and with a size of 7×20 mm was used as tab for electrical connection to the lithium anode. For fastening, the copper was pressed onto the Li foil. However, alternatively, electrical contact can be made directly to the Li metal surface, for example by a nickel tab welded or otherwise bonded to the Li foil.

Figure 1:
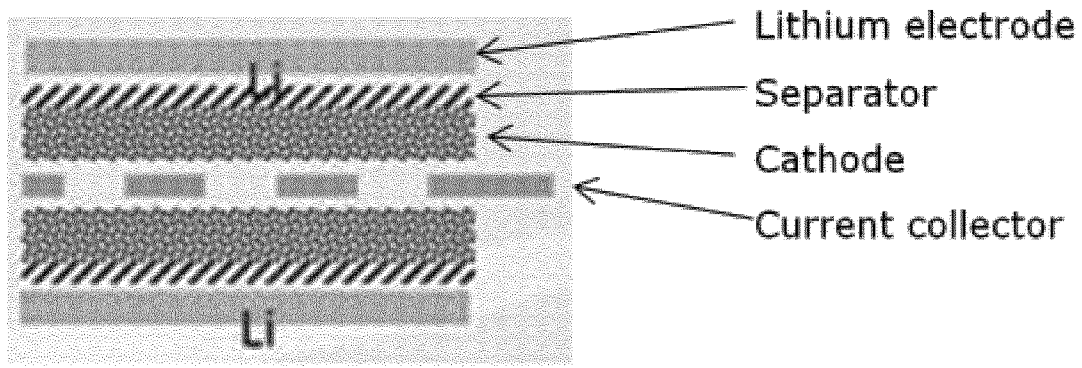

The sulfur cathode, the separator, and the current collector were provided as a layered structure, which is illustrated in the principle sketch of FIG. 1. A current collector forms the central layer of a sandwich structure in a stack of electrochemical cells. The cathode sulfur material is supported by a separator foil. The cathode/separator double layer is provided on opposite sides of the current collector and sandwiched between lithium anode layers.

Figure 2:
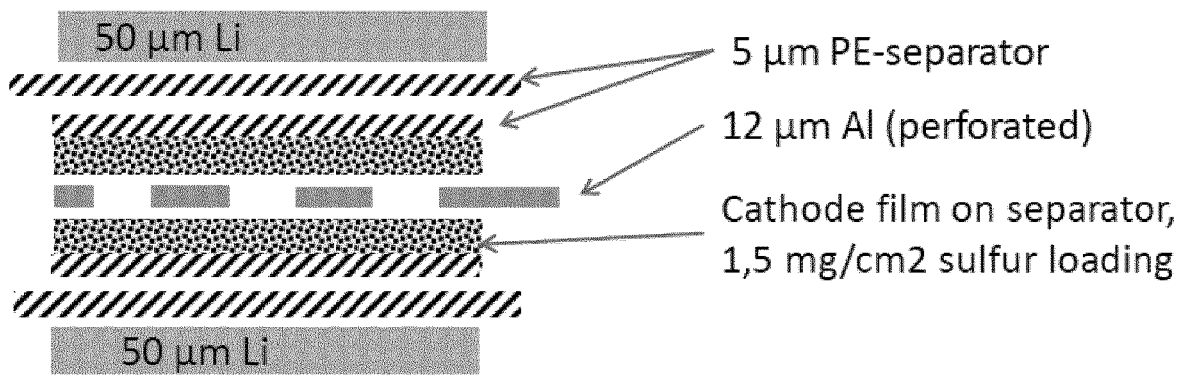
FIG. 2 is a sketch of the electrochemical cells in stacks used for experiments.

In experiments, for better separation, a double separator structure was used as illustrated in FIG. 2.

Figure 3:
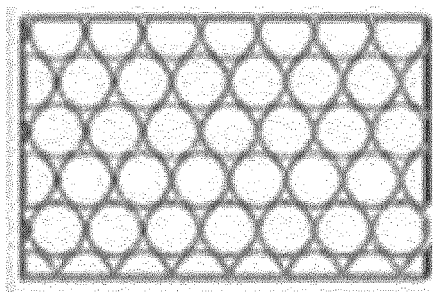
FIG. 3 illustrates a current collector that is perforated to form a grid.

The current collector was provided as a 12 micrometer thick perforated aluminium foil. The mass of the foil was reduced by providing the current collector as a grid, see FIG. 3, with openings throughout distributed across the aluminium foil. About 80% of the area of the current collector were openings, leaving only 20% of the area with aluminium material.

The current collector contained a primer coating of carbon, the coating having a thickness in the order of a micrometer.

A 5 micrometer thick porous polyethylene separator foil was provided. The micro had a size in the range of 20-200 nm.

The sulfur electrode comprises an electrically conductive porous carbon matrix having pores that contain sulfur. Porous carbon black particles (Printex™) were infiltrated with sulfur in a weight distribution of 1:2. The infiltration was done by providing a mix of carbon black particles and micrometer sized sulfur particles and heating the composite to 155° C. for 30 minutes under dry conditions prior to cooling down. This resulted in sulfur being homogeneously distributed inside the pores. The composite was then ground to carbon/sulfur composite particles having a size in the range of a few micrometer.

The resulting particles were suspended in water and a binder was added. The binder consisted of equal weight amounts of carboxymethyl cellulose (CMC) and styrene-butadiene rubber (SBR). Apart from water, the aqueous suspension contained 60% sulfur, 30% carbon black into which the 60% sulfur were infused, and 10% CMC/SBR binder. The relative amounts are in term of weight.

Advantageously, the pores are small. For example, at least 50% of the pore volume is defined by pores having an average pore diameter of less than 0.1 micron. With such small pore volumes, a cathode mass density of around 0.65 g/cm$^3$ was achieved. For the experiment, the pore volume of the cathode was 0.35 ml/g. This implies that only a minor amount of the electrolyte is contained inside the voids of the cathode. The remaining electrolyte is positioned between the electrodes.

As an alternative, in order to increase the electrical conductivity of the cathode, it contains carbon nanotubes (CNT), for example multi-walled carbon nanotubes MWCNT. The weight percentage is advantageously in the range of 5-20%, for example 10%. The percentage substituting a corresponding percentage of the carbon black or both carbon black and part of the binder. For example, the weight ratio between Sulfur:Carbon Black:CNT:binder is 60:25:10:5.

The aqueous suspension with the binder was scraped by a doctor-blade onto the separator where the separator is acting as a support for the cathode material. A good layer thickness was found experimentally in the range of 2-10 micrometer. In the experiment that is specifically reported herein, the thickness was 5 micrometer.

The covered separator was attached to either side of the current collector as illustrated in FIG. 2. A good practical method experimentally was found in folding the coated separator around the current collector and pressing it onto the current collector for bonding. It was experimentally found that a carbon primer coating of the current collector improved adhesion of the cathode to the current collector.

The electrolyte is partly filling the pores of the cathode matrix and fills the volume between the electrodes for transport of Li ions between the electrodes. With respect to the sulfur, the electrolyte is of the type that is sparingly solvating or non-solvating. For the experiment, the electrolyte was a 1.5 molar solution of LiTFSI in a blend of Hexylmethylether (HME) and 1.3 Dioxolane (DOL) at a volume ratio of 9:1.

Figure 4:
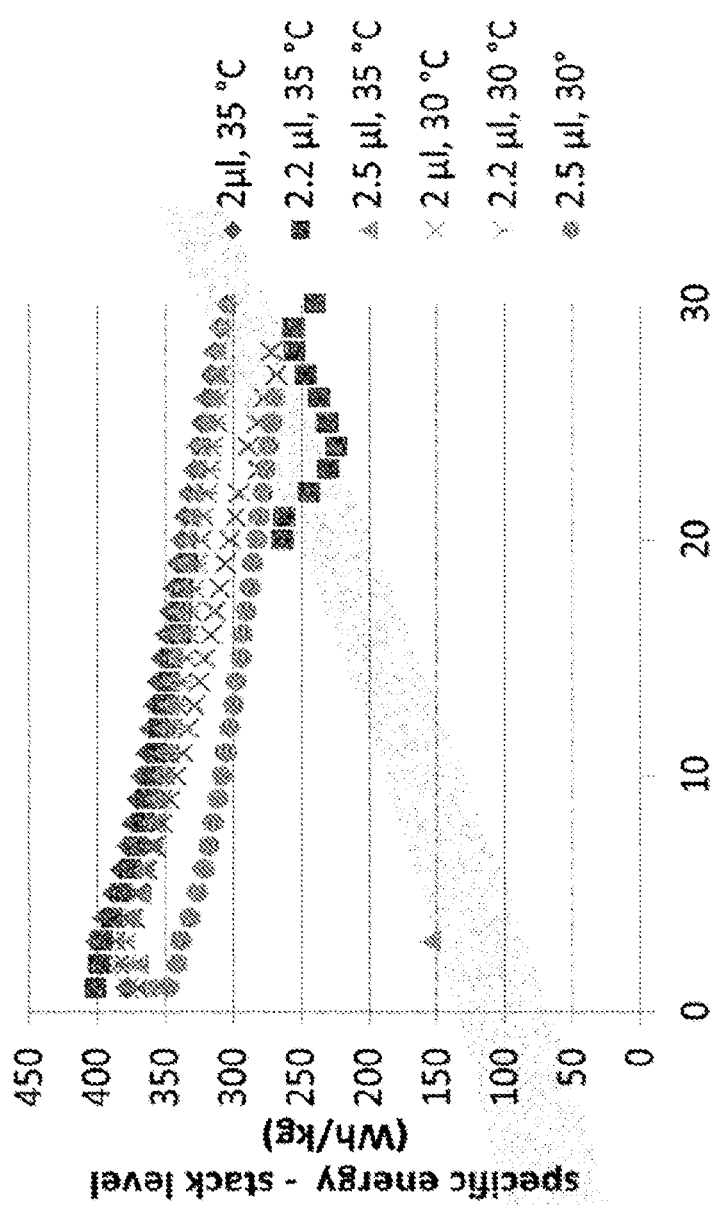
FIG. 4 shows energy density in experimental results for 2 to 2.5 ml electrolyte per g sulfur.

Experiments were performed initially at different temperatures with relative amounts of the electrolyte 2 μl/mg (=2 ml/g) as well as 2.2 and 2.5 2 μl/mg as illustrated in FIG. 4.

Encouraged by the surprisingly stable performance in the range of 2-2.5 ml/g further experiments were conducted with 1.6 ml/g.

Figure 5:
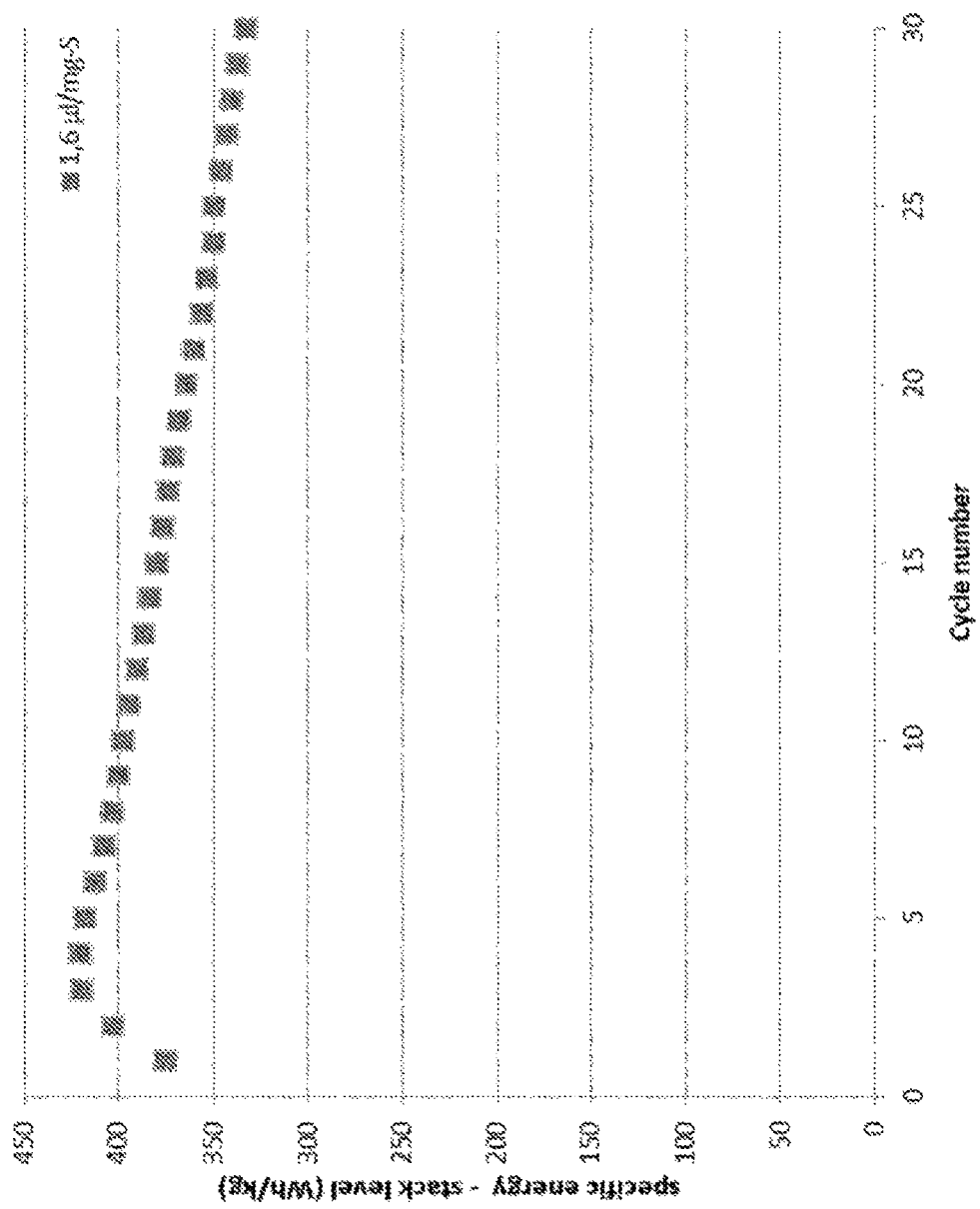
FIG. 5 shows energy density in experimental results for 1.6 ml/g.

FIG. 5 illustrates a measured energy density with a single electrochemical cell at 30° C. in a cell stack, the cell having the specification as described above without the weight of packaging material included in the weight of the single cell. It appears that the density is above 400 Wh/kg over 7 cycles after an initial start-up cycle. Over 20 cycles, the energy density was measured to be above 350 Wh/kg, and remained over 300 Wh/kg for more than 30 cycles, when charged and discharged at a charging rate of 0.1 C, which is 1/10 of the capacity discharge per hour such that a full discharge takes 10 hours. The discharge was done until the cut-off voltage criterium of 1.5 V was reached.

The table below lists specification with respect to weight distributions for such a cell containing 1.6 ml/g electrolyte relatively to the sulfur content.

| Component | Mass [g] | Relative mass in % |
|---|---|---|
| Sulfur | 0.54 | 18.9 |
| Carbon + Binder | 0.36 | 12.6 |
| Electrolyte | 0.93 | 32.5 |
| Aluminium | 0.13 | 4.5 |
| Copper | 0.08 | 2.8 |
| Lithium | 0.52 | 18.2 |
| Separator | 0.30 | 10.5 |
| Total | 2.86 | 100% |

For an efficient secondary battery, multiple of the above electrochemical cells are stacked, for example 10, 20, 30 or 40 layers of the above type sandwich-combinations of anode, separator, current collector, and cathode.

It has been found advantageous experimentally to provide pressure onto the stack, for example in the range of 20 to 50 N/cm$^2$. In experiments, a pressure of 37 N/cm$^2$ was applied.

The invention claimed is:

1. A battery containing an electrochemical cell comprising a negative lithium electrode;
   a positive sulfur electrode, the positive sulfur electrode comprising an electrically conductive porous carbon matrix having pores containing sulfur;
   a current collector abutting the positive sulfur electrode;
   a separator arranged between the negative lithium electrode and the positive sulfur electrode;
   an electrolyte arranged between the electrodes for transport of Li ions between the electrodes;
   wherein the electrolyte comprises Hexylmethylether, HME, 1,3 dioxolane, DOL, and a lithium salt, wherein the electrolyte between the electrodes is provided at an amount of less than 2 μl per mg sulfur.

2. The battery according to claim 1, wherein at a ratio between HME and DOL is in a range of 2:1 to 1:2.

3. The Battery according to claim 1, wherein the Li salt is bis(trifluoromethane)sulfonimide lithium salt, LiTFSI.

4. The battery according to claim 3, wherein the lithium salt in the electrolyte has a molar concentration in a range of 1M to 4M.

5. The battery according to claim 1, wherein the electrolyte is configured for dissolving only a fraction of available polysulfides during charge and discharge of the battery, the fraction being less than 5%.

6. The battery according to any one of the preceding claims claim 1, wherein an energy density of the electrochemical cell is higher than 400 Wh/kg for at least 5 cycles and higher than 350 Wh/kg for at least 20 cycles, when charged and discharged at a charging rate of 0.1C.

7. The battery according to claim 1, wherein the mass density of the positive sulfur electrode is higher than 0.55 g/cm$^3$.

8. The battery according to claim 1, wherein pores in the porous carbon matrix comprises pores with a pore volume, wherein at least 50% of the pore volume is defined by pores having an average pore diameter of less than 0.1 micron.

9. The battery according to claim 1, wherein the battery is constructed and arranged to apply a force onto the electrochemical cell in a direction normal to active surfaces of the electrodes during charging of the battery, the force being in a range of 10 to 50 N/cm$^2$.

10. The battery according to claim 1, wherein the current collector is a perforated metal sheet with perforations, the perforations in total having an area of more than 50% of the area of one side of the metal sheet; wherein the positive sulfur electrode is solidly bonded to the current collector, forming an electrode/collector sheet unit.

11. The battery according to claim 10, wherein the battery comprises a plurality of electrochemical cells arranged as a stack with two neighboring cells sharing the said current collector, wherein the said current collector is sandwiched between the said positive sulfur electrode and a further identical positive sulfur electrode of a neighboring cell.

12. The battery according to claim 11, wherein the separator comprises a coating of the porous sulfur-containing porous carbon matrix for providing a combination of cathode and separator, wherein each two of such combinations are sandwiching one current collector with the cathode side facing the current collector and being fastened to the current collector, and wherein the combinations are fastened to each other by extending through the perforations of the current collector.

13. The battery according to claim 11, wherein the stack is under pressure by a force in a range of 10 to 50 N/cm$^2$.

14. The battery according to claim 1, wherein the electrolyte is free from lithium nitrate, $LiNO_3$.

* * * * *